United States Patent
Yamazaki et al.

(10) Patent No.: US 11,827,729 B2
(45) Date of Patent: Nov. 28, 2023

(54) METHOD FOR PRODUCING POLYVINYLPHOSPHONIC ACID COPOLYMER

(71) Applicant: MARUZEN PETROCHEMICAL CO., LTD., Chuo-ku (JP)

(72) Inventors: Tadashi Yamazaki, Ichihara (JP); Masahiro Endo, Ichihara (JP)

(73) Assignee: MARUZEN PETROCHEMICAL CO., LTD., Chuo-ku (JP)

(*) Notice: Subject to any disclaimer, the term of this patent is extended or adjusted under 35 U.S.C. 154(b) by 197 days.

(21) Appl. No.: 17/414,693

(22) PCT Filed: Dec. 16, 2019

(86) PCT No.: PCT/JP2019/049091
§ 371 (c)(1),
(2) Date: Jun. 16, 2021

(87) PCT Pub. No.: WO2020/129875
PCT Pub. Date: Jun. 25, 2020

(65) Prior Publication Data
US 2022/0306788 A1 Sep. 29, 2022

(30) Foreign Application Priority Data
Dec. 17, 2018 (JP) .................. 2018-235806

(51) Int. Cl.
*C08F 230/02* (2006.01)
*C08F 4/04* (2006.01)
*C08F 30/02* (2006.01)

(52) U.S. Cl.
CPC .............. *C08F 230/02* (2013.01); *C08F 4/04* (2013.01)

(58) Field of Classification Search
CPC ........... C08F 230/02; C08F 4/04; C08F 30/02
See application file for complete search history.

(56) References Cited

U.S. PATENT DOCUMENTS

| | | | |
|---|---|---|---|
| 4,696,987 A | 9/1987 | Dürsch et al. | |
| 4,743,666 A | 5/1988 | Engelhardt et al. | |
| 4,749,758 A | 6/1988 | Duersch et al. | |
| 2018/0243464 A1* | 8/2018 | Hwang | A61L 15/24 |

FOREIGN PATENT DOCUMENTS

| | | | |
|---|---|---|---|
| CN | 103848944 A | 6/2014 | |
| EP | 0 652 238 A2 | 5/1995 | |
| EP | 0 652 238 A3 | 5/1995 | |
| JP | 49-14355 B1 | 4/1974 | |
| JP | 59-115316 A | 7/1984 | |
| JP | 60-260606 A | 12/1985 | |
| JP | WO 2016/148153 A1 | 9/2016 | |
| JP | 2018-143969 A | 9/2018 | |
| WO | WO-2016053327 A1 * | 4/2016 | ............... C09K 8/56 |
| WO | WO 2019/118416 A1 | 6/2019 | |

OTHER PUBLICATIONS

Extended European Search Report dated Oct. 6, 2022 in European Patent Application No. 19900721.2, 6 pages.
MacArie, L. et al., "Properties in Aqueous Solution of Homo- and Copolymers of Vinylphosphonic Acid Derivatives Obtained by UV-Curing", 2017, Macromolecular Research, vol. 25, No. 3, pp. 214-221.
International Search Report dated Mar. 10, 2020 in PCT/JP2019/049091 filed on Dec. 16, 2019 (3 pages).

* cited by examiner

Primary Examiner — Catherine S Branch
(74) Attorney, Agent, or Firm — Oblon, McClelland, Maier & Neustadt, L.L.P.

(57) ABSTRACT

A method for producing a polyvinylphosphonic acid copolymer may control a rise in internal temperature in the reaction system during polymerization and may allow synthesis of a copolymer as a polymer solution. A method for producing a polyvinylphosphonic acid copolymer may include polymerizing a compound of formula (1) and a compound of formula (2) in presence of a radical polymerization initiator and in a water-containing solvent:

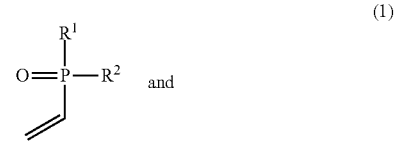

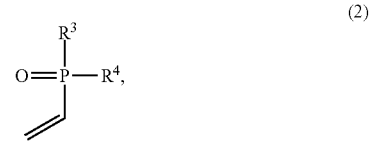

wherein $R^1$ and $R^2$ are independently —OH, —O⁻, or —O⁻M⁺ (M⁺ being a counter ion), $R^3$ is —OH, —O⁻, —O⁻M⁺, or an optionally substituted alkoxy group having 1 to 10 carbon atoms (M⁺ being a counter ion), and $R^4$ is an optionally substituted alkoxy group having 1 to 10 carbon atoms, $R^3$ and $R^4$ optionally forming a ring together with an adjacent phosphorus atom when both $R^3$ and $R^4$ are alkoxy groups.

20 Claims, No Drawings

METHOD FOR PRODUCING POLYVINYLPHOSPHONIC ACID COPOLYMER

CROSS-REFERENCE TO RELATED APPLICATIONS

The present application is the national stage of international application PCT/JP2019/049091, filed on Dec. 16, 2019, and claims the benefit of the filing date of Japanese Appl. No. 2018-235806, filed on Dec. 17, 2018.

TECHNICAL FIELD

The present invention relates to a method for producing a polyvinylphosphonic acid copolymer.

BACKGROUND ART

A polyvinylphosphonic acid copolymer is used as, for example, a polymer electrolyte material for a fuel cell, a halogen-free flame retardant, a metal surface treatment agent, a biocompatible material, and a food packaging material, and has a wide range of their applications.

A radical polymerization method is known as an example of a method for producing such a polyvinylphosphonic acid copolymer. For example, as a method for producing a copolymer of vinylphosphonic acid and dimethyl vinylphosphonate, a method of performing a radical polymerization by irradiating ultraviolet light with a photopolymerization initiator without a solvent is known (Non-Patent Literature 1). In Non-Patent Literature 1, it reports that the above-mentioned copolymer having a weight average molecular weight of 12,700 to 19,120 was obtained in a very short reaction time.

CITATION LIST

Non-Patent Literature

Non-Patent Literature 1: Macromol. Res., Vol. 25, Issue 3, 214-221 (2017)

SUMMARY OF INVENTION

Technical Problem

However, in Non-Patent Literature 1, the copolymer of vinylphosphonic acid and dimethyl vinylphosphonate is exclusively obtained as a cured film, and an intended use of the copolymer is limited.

Furthermore, when the present inventors tried to produce the copolymer of vinylphosphonic acid and dimethyl vinylphosphonate by the method described in Non-Patent Literature 1, it found that a thermal runaway reaction occurred and it was difficult to control a rise in the internal temperature in the reaction system.

An object of the present invention is to provide a method for producing a polyvinylphosphonic acid copolymer which can control a rise in the internal temperature in the reaction system during a polymerization reaction and by which the copolymer is synthesized in the form of a polymer solution.

Solution to Problem

As a result of intensive studies to solve the above problem, the present inventors found that a radical polymerization reaction of vinyl phosphonic acid and vinyl phosphonic acid ester proceeds in a water-containing solvent, and further, in the polymerization reaction, not only the copolymer is synthesized in the form of a polymer solution, but also a rise in the internal temperature in the reaction system during the polymerization reaction can be easily controlled. Consequently, they completed the present invention.

That is, the present invention provides the following <1> to <7>.

<1> A method for producing a polyvinylphosphonic acid copolymer including a polymerization step of polymerizing a compound represented by the following formula (1) (hereinafter, also referred to as "monomer (1)") and a compound represented by the following formula (2) (hereinafter, also referred to as "monomer (2)") in presence of a radical polymerization initiator and in a water-containing solvent (hereinafter, also referred to as "method for producing a polyvinylphosphonic acid copolymer of the present invention" and "production method of the present invention").

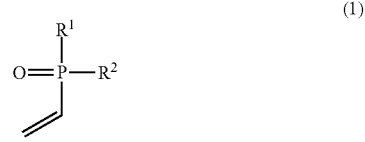

wherein $R^1$ and $R^2$ independently represent —OH, —O⁻, or —O⁻M⁺ (M⁺ represents a counter ion),

wherein $R^3$ represents —OH, —O⁻, —O⁻M⁺, or a substituted or unsubstituted alkoxy group having 1 to 10 carbon atoms (M⁺ represents a counter ion), and $R^4$ represents a substituted or unsubstituted alkoxy group having 1 to 10 carbon atoms, provided that $R^3$ and $R^4$ may form a ring together with an adjacent phosphorus atom when both $R^3$ and $R^4$ are alkoxy groups.

<2> The production method according to <1>, wherein the compound represented by the formula (2) is one or more selected from the group consisting of methyl vinylphosphonate, dimethyl vinylphosphonate, ethyl vinylphosphonate, and diethyl vinylphosphonate.

<3> The production method according to <1> or <2>, wherein the polymerization step is a step of polymerizing the compound represented by the formula (1) and the compound represented by the formula (2) at a molar ratio of 10:90 to 90:10.

<4> The production method according to any one of <1> to <3>, wherein the radical polymerization initiator is one or more selected from the group consisting of 2,2'-azobis(2-methylpropionamidine)dihydrochloride, 2,2'-azobis[2-(2-imidazolin-2-yl)propane]dihydrochloride, 2,2'-azobis[2-(2-imidazolin-2-yl)propane]disulfate dihydrate, 2,2'-azobis[2-(2-imidazolin-2-yl)propane], and 2,2'-azobis[N-(2-carboxyethyl)-2-methylpropionamidine]n hydrates.

<5> The production method according to any one of <1> to <4>, wherein a polymerization temperature in the polymerization step is 60° C. or more and 80° C. or less.

<6> The production method according to any one of <1> to <5>, wherein the polyvinylphosphonic acid copolymer has a weight average molecular weight (Mw) in the range of 3,000 to 12,000.

<7> A polymerizable composition comprising: a monomer (1); a monomer (2); a radical polymerization initiator; and water (hereinafter, also referred to as "the polymerizable composition of the present invention").

Advantageous Effects of Invention

According to the production method of the present invention, a rise in the internal temperature in the reaction system during the polymerization reaction can be controlled, and a polyvinylphosphonic acid copolymer can be synthesized in the form of a polymer solution.

By producing a polyvinylphosphonic acid copolymer using the polymerizable composition of the present invention, it is possible to synthesize a polyvinylphosphonic acid copolymer in the form of a polymer solution while controlling the rise in the internal temperature in the reaction system during the polymerization reaction.

DESCRIPTION OF EMBODIMENTS

<Method for Producing Polyvinylphosphonic Acid Copolymer>

A method for producing a polyvinylphosphonic acid copolymer of the present invention includes a polymerization step of polymerizing a compound represented by the following formula (1) and a compound represented by the following formula (2) in presence of a radical polymerization initiator and in a water-containing solvent:

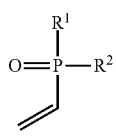

(1)

wherein $R^1$ and $R^2$ independently represent —OH, —O⁻, or —O⁻M⁺ (M⁺ represents a counter ion),

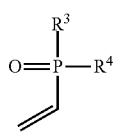

(2)

wherein $R^3$ represents —OH, —O⁻, —O⁻M⁺, or a substituted or unsubstituted alkoxy group having 1 to 10 carbon atoms (M⁺ represents a counter ion), and $R^4$ represents a substituted or unsubstituted alkoxy group having 1 to 10 carbon atoms, provided that $R^3$ and $R^4$ may form a ring together with an adjacent phosphorus atom when both $R^3$ and $R^4$ are alkoxy groups.

In the formulas (1) and (2), M⁺ represents a counter ion, respectively. Examples of the counter ion include alkali metal ions such as a sodium ion and a potassium ion; alkaline earth metal ions such as a magnesium ion and a calcium ion; an ammonium ion; and an organic ammonium ion.

The alkoxy group represented by $R^3$ and $R^4$ has preferably 1 to 8 carbon atoms, more preferably 1 to 6 carbon atoms, further preferably 1 to 4 carbon atoms, and particularly preferably 1 to 2 carbon atoms. Furthermore, the alkoxy group may be linear or branched. Specific examples of the alkoxy group include a methoxy group, an ethoxy group, an n-propoxy group, an isopropoxy group, an n-butoxy group, an isobutoxy group, a tert-butoxy group, an n-pentyloxy group, and an n-hexyloxy group.

The alkoxy group represented by $R^3$ and $R^4$ may or may not have a substituent. Examples of the substituent include halogen atoms such as a chlorine atom, a bromine atom, and a fluorine atom. The substitution position and the number of substitutions of the substituent are arbitrary, and when the alkoxy group has two or more substituents, the substituents may be the same or different.

Examples of a ring that $R^3$ and $R^4$ may form together include an ethenylphosphonate alkanediyl ring having a total carbon number of 4 to 12 (preferably a total carbon number of 5 to 8) such as an ethenylphosphonic acid 1,2-ethanediyl ring, an ethenylphosphonic acid 2,3-dimethyl-2,3-butanediyl ring, an ethenylphosphonic acid 1,3-propanediyl ring, and an ethenylphosphonic acid 2,2-dimethyl-1,3-propanediyl ring.

Examples of the monomer (1) include vinyl phosphonic acid.

The amount of the monomer (1) used is preferably 10 mol % or more, more preferably 20 mol % or more, and particularly preferably 22.5 mol % or more based on 100 mol % of the total amount of the monomers used in the polymerization step, and is preferably 90 mol % or less, more preferably 80 mol % or less, and particularly preferably 77.5 mol % or less based on 100 mol % of the total amount of monomers used in the polymerization step. As the specific range, 10 mol % or more and 90 mol % or less are preferable, 20 mol % or more and 80 mol % or less are more preferable, and 22.5 mol % or more and 77.5 mol % or less are particularly preferable.

Examples of the monomer (2) include methyl vinylphosphonate, dimethyl vinylphosphonate, ethyl vinylphosphonate, diethyl vinylphosphonate, vinylphosphonic acid bis(2-chloroethyl) ester, dipropyl vinylphosphonate, vinylphosphonic acid diisopropyl ester, ethenylphosphonic acid 2,3-dimethyl-2,3-butanediyl, ethenylphosphonic acid 1,3-propanediyl ester, and ethenylphosphonic acid 2,2-dimethyl-1,3-propanediyl ester. Among these, one kind may be used alone, or two or more kinds may be used in combination.

Among these, from the viewpoint of the solubility of the monomer and the reactivity of the polymerization reaction, methyl vinylphosphonate, dimethyl vinylphosphonate, ethyl vinylphosphonate, and diethyl vinylphosphonate are preferable, methyl vinylphosphonate and dimethyl vinylphosphonate are more preferable, and dimethyl vinylphosphonate is particularly preferable.

In the above polymerization step, from the viewpoint of the reactivity of the polymerization reaction, it is preferable to polymerize the monomer (1) and the monomer (2) at a molar ratio of the monomer (1) to the monomer (2) [(1):(2)] of 10:90 to 90:10, it is more preferable to polymerize at a molar ratio of 20:80 to 80:20, and it is particularly preferable to polymerize at a molar ratio of 22.5:77.5 to 77.5:22.5. The weight average molecular weight (Mw) of the polyvinylphosphonic acid copolymer can be increased or decreased by changing the molar ratio [(1):(2)].

In the above polymerization step, a monomer other than the monomer (1) and the monomer (2) (hereinafter, also referred to as "another monomer") may be copolymerized together with the monomer (1) and the monomer (2). Examples of another monomer include unsaturated carboxylic acid monomers such as acrylic acid and methacrylic acid; unsaturated dicarboxylic acid monomers such as fumaric acid, maleic acid, and itaconic acid; and unsaturated dicarboxylic acid anhydride monomers such as maleic anhydride and itaconic acid anhydride; (meth)acrylate monomers such as methyl acrylate and methyl methacrylate; (meth) acrylamide monomers such as acrylamide and methacrylamide; aromatic vinyl monomers such as styrene and α-methylstyrene; and vinyl carboxylate monomers such as vinyl acetate. As for another monomer, one kind may be used alone or two or more kinds may be used in combination.

The total amount of the monomer (1) and the monomer (2) used is preferably 85 mol % or more, more preferably 90 mol % or more, further preferably 95 mol % or more, and particularly preferably 97.5 mol % or more based on 100 mol % of the total amount of the monomers used in the polymerization step, and is preferably 100 mol % or less based on 100 mol % of the total amount of monomers used in the polymerization step.

The radical polymerization initiator used in the production method of the present invention may be any initiator used in the radical polymerization reaction, and an organic peroxide initiator and an organic azo compound initiator are preferable.

Examples of the organic peroxide initiator include ketone peroxides such as methyl ethyl ketone peroxide; diacyl peroxides such as dilauroyl peroxide; dialkyl peroxides such as di-tert-butyl peroxide; peroxyketals; alkyl peroxy esters; and peroxy carbonates. Examples of the organic azo compound initiator include azoamidines; azoimidazolines; azonitriles such as 4,4'-azobis(4-cyanovaleric acid); azoesters; and azoamides such as 2,2'-azobis[2-methyl-N-(2-hydroxyethyl)propionamide].

Among the radical polymerization initiators, the organic azo compound initiator is preferable, and the water-soluble organic azo compound initiator is more preferable from the viewpoint of the reactivity of the polymerization reaction.

As the water-soluble organic azo compound initiator, 2,2'-azobis(2-methylpropionamidine)dihydrochloride, 2,2'-azobis[2-(2-imidazolin-2-yl)propane]dihydrochloride, 2,2'-azobis[2-(2-imidazolin-2-yl)propane]disulfate dihydrate, 2,2'-azobis[2-(2-imidazolin-2-yl)propane], and 2,2'-azobis [N-(2-carboxyethyl)-2-methylpropionamidine]n hydrates are preferable from the viewpoint of the reactivity of the polymerization reaction, and 2,2'-azobis(2-methylpropionamidine) dihydrochloride is particularly preferable.

As for the radical polymerization initiator, one kind may be used alone or two or more kinds may be used in combination.

From the viewpoint of the reactivity of the polymerization reaction, the amount of the radical polymerization initiator used is usually about 0.05 to 25 mol %, and preferably 0.1 to 10 mol % based on 100 mol % of the total amount of monomers used in the polymerization step.

The water-containing solvent used in the production method of the present invention means a solvent containing water. Examples of the water-containing solvent include water and a mixed solution of water and an organic solvent. As the organic solvent, monohydric lower alcohols such as ethanol, propanol, and isopropyl alcohol (preferably monohydric alcohols having 1 to 4 carbon atoms) are preferable. The content of water in the water-containing solvent is preferably 80 to 100% by mass, more preferably 90 to 100% by mass, and particularly preferably 99 to 100% by mass, from the viewpoint of the reactivity of the polymerization reaction. Among such a water-containing solvent, water is particularly preferable from the viewpoint of the reactivity of the polymerization reaction.

The amount of the water-containing solvent used is preferably 10 parts by mass or more, more preferably 25 parts by mass or more, further preferably 50 parts by mass or more, and particularly preferably 75 parts by mass or more based on 100 parts by mass of the total of the monomer (1) and the monomer (2) from the viewpoint of the reactivity of the polymerization reaction, and is preferably 1000 parts by mass or less, more preferably 500 parts by mass or less, further preferably 250 parts by mass or less, further preferably 150 parts by mass or less, and particularly preferably 125 parts by mass or less based on 100 parts by mass of the total of the monomer (1) and the monomer (2) from the viewpoint of reactivity of the polymerization reaction. As a specific range, 10 parts by mass or more and 1000 parts by mass or less are preferable, 25 parts by mass or more and 500 parts by mass or less are more preferable, 50 parts by mass or more and 150 parts by mass or less are further preferable, and 75 parts by mass or more and 125 parts by mass or less are particularly preferable.

The polymerization temperature in the polymerization step may be set according to the kind of the radical polymerization initiator, and is preferably 50° C. or higher, more preferably 55° C. or higher, further preferably 60° C. or higher and particularly preferably 65° C. or higher, and preferably 80° C. or lower and more preferably 75° C. or lower from the viewpoint of the reactivity of the polymerization reaction. As a specific range, 50° C. or more and 80° C. or less is preferable, 55° C. or more and 80° C. or less is more preferable, 60° C. or more and 75° C. or less is further preferable, and 65° C. or more and 75° C. or less is particularly preferable. According to the production method of the present invention, a rise in the internal temperature in the reaction system during the polymerization reaction can be controlled, and the polymerization can proceed while maintaining a mild temperature condition.

The polymerization time is usually 30 minutes to 72 hours, preferably 1 to 36 hours, and more preferably 2 to 24 hours.

Furthermore, examples of a specific method of the polymerization step include a method of adding a monomer, a radical polymerization initiator and a water-containing solvent to the reaction vessel and then heating to start the polymerization, and a method in which a reaction vessel to which a monomer and a water-containing solvent have been added in advance is heated, and, for example, a radical polymerization initiator is sequentially added dropwise thereto for polymerization.

Furthermore, the production method of the present invention may include, in addition to the above polymerization step, a purification step of purifying the polyvinylphosphonic acid copolymer from the polyvinylphosphonic acid copolymer-containing liquid obtained in the polymerization step. The specific method for the purification is not particularly limited, and it is preferable to isolate and purify by reprecipitation purification or recrystallization using vacuum distillation or a poor solvent.

As used herein, the term "polyvinylphosphonic acid copolymer" means a polymer having a structural unit derived from the monomer (1) and a structural unit derived from the monomer (2).

The content of the structural unit derived from the monomer (1) is preferably 10 mol % or more, more preferably 20 mol % or more, and particularly preferably 22.5 mol % or more based on 100 mol % of the total structural unit contained in the polyvinylphosphonic acid copolymer, and is preferably 90 mol % or less, more preferably 80 mol % or less, and particularly preferably 77.5 mol % or less based on 100 mol % of the total structural unit contained in the polyvinylphosphonic acid copolymer. As the specific range, 10 mol % or more and 90 mol % or less are preferable, 20 mol % or more and 80 mol % or less are more preferable, and 22.5 mol % or more and 77.5 mol % or less are particularly preferable.

The molar ratio <(1):(2)> of the structural unit derived from the monomer (1) to the structural unit derived from the monomer (2) is preferably 10:90 to 90:10, more preferably 20:80 to 80:20, and particularly preferably 22.5:77.5 to 77.5:22.5.

The total content of the structural unit derived from the monomer (1) and the structural unit derived from the monomer (2) is preferably 85 mol % or more, more preferably 90 mol % or more, further preferably 95 mol % or more, and particularly preferably 97.5 mol % or more based on 100 mol % of the total structural units contained in the polyvinylphosphonic acid copolymer, and is preferably 100 mol % or less based on 100 mol % of all structural units contained in the polyvinylphosphonic acid copolymer.

Furthermore, as the polyvinylphosphonic acid copolymer, a polymer having a one-dimensional structure (linear polymer compound) is preferable. The arrangement of the structural unit is arbitrary, and may be any of a random copolymer, an alternating copolymer, and a block copolymer.

Furthermore, as the polyvinylphosphonic acid copolymer, a polyvinyl phosphonic acid water-soluble copolymer is preferable. In the present specification, when 10 parts by mass of the polyvinylphosphonic acid copolymer is added to and mixed with 90 parts by mass of water (25° C.) and the mixture is visually transparent, the polyvinylphosphonic acid copolymer is assumed to be water-soluble.

The polyvinylphosphonic acid copolymer has a weight average molecular weight (Mw) in the range of 3,000 to 12,000, more preferably in the range of 5,000 to 10,000, and particularly preferably in the range of 5,500 to 9,500. According to the production method of the present invention, such a copolymer having a low weight average molecular weight (Mw) can be easily produced.

The molecular weight distribution (Mw/Mn) is preferably in the range of 1.0 to 3.0, more preferably in the range of 1.0 to 2.0.

In the present specification, the weight average molecular weight (Mw) and the molecular weight distribution (Mw/Mn) mean the values measured by gel permeation chromatography (GPC). Specifically, these can be measured by the method described in Examples described later.

Then, according to the production method of the present invention it is possible to suppress the rise in internal temperature in the reaction system during the polymerization reaction and to adjust and control the rise in internal temperature, and a polyvinylphosphonic acid copolymer can be synthesized in the form of a polymer solution that can be widely used.

Therefore, the production method of the present invention is extremely useful as an industrial production method for a polyvinylphosphonic acid copolymer.

<Polymerizable Composition>

The polymerizable composition of the present invention contains a monomer (1), a monomer (2), a radical polymerization initiator, and water.

The meaning of various words in the polymerizable composition of the present invention, the content of each component, etc. are the same as the meaning of various words described in the "method for producing a polyvinylphosphonic acid copolymer", the amount of each component used, and the like.

EXAMPLES

Hereinafter, the present invention is described in detail with reference to examples, and the present invention is not limited to these examples.

In the example, the monomer conversion rate in the polymerization reaction was calculated by measuring the amount of monomer consumed using 160 MHz $^{31}$P-NMR.

($^{31}$P-NMR Measurement Conditions)
NMR measuring device: JEOL AL-400 (manufactured by JEOL Ltd.)
Solvent: heavy water The weight average molecular weight (Mw) of the copolymer was measured by gel permeation chromatography (GPC) under the following conditions.

(Mw Measurement Conditions)
Column: Shodex GPC SB-G 6B+SB-805 HQ+SB-804 HQ (manufactured by Showa Denko K.K.)
Solvent: 0.2 mol/L sodium chloride aqueous solution
Measurement temperature: 40° C.
Flow velocity: 0.5 mL/min
Calibration curve: Standard polyethylene glycol/polyoxyethylene standard Example 1

In a 500 mL flask, 93.0 g of vinyl phosphonic acid (manufactured by Euticals) and 117.1 g of dimethyl vinylphosphonate (manufactured by Maruzen Petrochemical Co., Ltd.) as monomers and 140.0 g of ion-exchanged water as a polymerization solvent were added and mixed well.

Separately, in a 100 mL flask, 5.7 g (20.9 mmol, 1.2 mol to a total of 100 mol of the monomers) of 2,2'-azobis(2-methylpropionamidine)dihydrochloride (manufactured by FUJIFILM Wako Pure Chemical Corporation) (hereinafter, also referred to as "AIBA") and 64.4 g of ion-exchanged water were added, and then the mixture was stirred until AIBA was dissolved. This solution is also referred to as an "initiator solution".

Next, the above-mentioned 500 mL flask in which the monomer was added was immersed to a water bath preheated to 73° C. When the internal temperature reached 69° C., the initiator solution was added dropwise to initiate the polymerization reaction. The initiator solution was added dropwise over 6 hours and aged for 2 hours after completion of the addition. During the polymerization reaction, the temperature of the water bath was appropriately adjusted so that the temperature of the reaction solution was 70° C.±2° C. As a result, the temperature of the reaction solution could be controlled in the range of 69.0 to 70.8° C.

After completion of the polymerization reaction, the flask was cooled in an ice bath to terminate the reaction. This resulted in obtaining a polymer of a slightly yellow transparent liquid. The conversion rate of vinylphosphonic acid was 90.7%, the conversion rate of dimethyl vinylphosphonate was 84.8%, and Mw value was 7,400.

Example 2

The polymerization reaction was carried out in the same manner as in Example 1 except that the amounts of the monomers added were 44.3 g of vinylphosphonic acid and 165.9 g of dimethyl vinylphosphonate.

As a result, the temperature of the reaction solution during the polymerization reaction could be controlled in the range of 69.0 to 70.8° C. as in Example 1. The conversion rate of vinylphosphonic acid was 91.2%, the conversion rate of dimethyl vinylphosphonate was 87.0%, and the Mw value was 6,100.

Example 3

The polymerization reaction was carried out in the same manner as in Example 1 except that the amounts of the monomers added were 148.2 g of vinylphosphonic acid and 62.2 g of dimethyl vinylphosphonate.

As a result, the temperature of the reaction solution during the polymerization reaction could be controlled in the range of 69.0 to 70.8° C. as in Example 1. The conversion rate of vinylphosphonic acid was 90.5%, the conversion rate of dimethyl vinylphosphonate was 82.9%, and the Mw value was 8,800.

Comparative Example 1

Vinyl phosphonic acid and dimethyl vinylphosphonate were polymerized by UV irradiation without a solvent.

That is, 3.0 g of vinyl phosphonic acid and 3.0 g of dimethyl vinylphosphonate as monomers, 0.090 g of DAROCURE1173 as a photopolymerization initiator, and 0.090 g of diphenyl(2,4,6-trimethylbenzoyl)phosphine oxide were mixed well. The obtained mixture (0.50 g) was collected and placed on a PTFE plate with 5 cm square. The mixture was irradiated with UV having an illuminance of 75 mw/cm$^2$ for 1 minute, and the temperature of the mixture during the polymerization reaction was measured. The temperature continued to rise during the polymerization reaction, and the temperature 1 minute after the start of UV irradiation was 104.0° C. After completion of the polymerization reaction, a polymer was obtained as a yellow cured product.

Comparative Example 2

The polymerization reaction was carried out in the same manner as in Comparative Example 1 except that the amounts of the monomers added were 4.0 g of vinylphosphonic acid and 2.0 g of dimethyl vinylphosphonate. Similar to Comparative Example 1, the temperature continued to rise during the polymerization reaction, and the temperature 1 minute after the start of UV irradiation was 108.0° C.

Comparative Example 3

The polymerization reaction was carried out in the same manner as in Comparative Example 1 except that the amounts of the monomers added ware 4.5 g of vinylphosphonic acid and 1.5 g of dimethyl vinylphosphonate. Similar to Comparative Example 1, the temperature continued to rise during the polymerization reaction, and the temperature 1 minute after the start of UV irradiation was 108.0° C.

Comparative Example 4

The polymerization reaction was carried out in the same manner as in Comparative Example 1 except that the amounts of the monomers added were 4.8 g of vinylphosphonic acid and 1.2 g of dimethyl vinylphosphonate. Similar to Comparative Example 1, the temperature continued to rise during the polymerization reaction, and the temperature 1 minute after the start of UV irradiation was 95.0° C.

The results of Examples and Comparative Examples are summarized in Table 1 below.

TABLE 1

| Experimental system | Addition ratio (mol) Vinylphosphonic acid:dimethyl vinylphosphonate | Solvent | Maximum temperature rise/° C. | Form of product |
|---|---|---|---|---|
| Example 1 | 50:50 | Water | 70.8 | Solution |
| Example 2 | 25:75 | | 70.8 | |
| Example 3 | 75:25 | | 70.8 | |
| Comparative Example 1 | 56:44 | Non-use | 104.0 | Cured product |
| Comparative Example 2 | 71:29 | | 108.0 | |
| Comparative Example 3 | 79:21 | | 108.0 | |
| Comparative Example 4 | 83:17 | | 95.0 | |

From the results of Examples 1 to 3, the monomer (1) represented by vinylphosphonic acid and the monomer (2) represented by dimethyl vinylphosphonate could be radically polymerized in water while controlling the rise in internal temperature in the reaction system. It found that the polyvinylphosphonic acid copolymer can be obtained as a polymer solution by the radical polymerization reaction. Furthermore, it found that the weight average molecular weight (Mw) value of the produced polyvinylphosphonic acid copolymer varied by changing the molar ratio of the monomer (1) and the monomer (2).

Meanwhile, in Comparative Examples 1 to 4, it attempted to produce a polyvinylphosphonic acid copolymer by radical polymerization of vinylphosphonic acid and dimethyl vinylphosphonate by irradiating ultraviolet light using a photopolymerization initiator without a solvent in accordance with the description of Non-Patent Literature. Consequently, a thermal runaway reaction occurred, and the rise in internal temperature in the reaction system could not be controlled. Further, it found that only a cured product of a polyvinylphosphonic acid copolymer could be obtained.

The invention claimed is:

1. A method for producing a polyvinylphosphonic acid copolymer, the method comprising:
    polymerizing a first compound of formula (1) and a second compound of formula (2) in presence of a radical polymerization initiator and in a water-containing solvent:

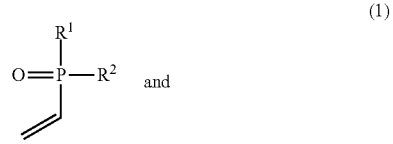

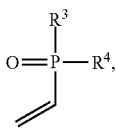 (2)

wherein
R¹ and R² are independently —OH, —O⁻, or —O⁻M⁺, with M⁺ being a counter ion,
R³ is —OH, —O⁻, —O⁻M⁺, or an optionally substituted alkoxy group comprising 1 to 10 carbon atoms, with M⁺ being a counter ion, and
R⁴ is an optionally substituted alkoxy group comprising 1 to 10 carbon atoms, R³ and R⁴ optionally forming a ring together with an adjacent phosphorus atom when both R³ and R⁴ are alkoxy groups,
wherein the radical polymerization initiator comprises 2,2'-azobis[2-(2-imidazolin-2-yl)propane] disulfate dihydrate, 2,2'-azobis[2-(2-imidazolin-2-yl)propane], and/or a 2,2'-azobis[N-(2-carboxyethyl)-2-methylpropionamidine] n-hydrate.

2. The method of claim 1, wherein the second compound is one or more selected from the group consisting of methyl vinylphosphonate, dimethyl vinylphosphonate, ethyl vinylphosphonate, and diethyl vinylphosphonate.

3. The method of claim 1, wherein, in the polymerizing, the first compound and the second compound are present in a molar ratio in a range of from 10:90 to 90:10.

4. The method of claim 1, wherein a polymerization temperature in the polymerizing is in a range of from 60 to 80° C.

5. The method of claim 1, wherein the polyvinylphosphonic acid copolymer has a weight average molecular weight ($M_w$) in a range of from 3,000 to 12,000.

6. A polymerizable composition, comprising:
water;
a radical polymerization initiator;
a first compound of formula (1)

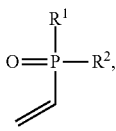 (1)

wherein R¹ and R² are independently —OH, —O⁻, or —O⁻M⁺ with M⁺ being a counter ion; and
a second compound of formula (2)

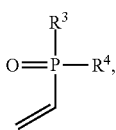 (2)

wherein R³ is —OH, —O⁻, —O⁻M⁺, or an optionally substituted alkoxy group comprising 1 to 10 carbon atoms, with M⁺ being a counter ion, and
R⁴ is an optionally substituted alkoxy group comprising 1 to 10 carbon atoms, R³ and R⁴ optionally forming a ring together with an adjacent phosphorus atom when both R³ and R⁴ are alkoxy groups,
wherein the radical polymerization initiator comprises 2,2'-azobis(2-methylpropionamidine) dihydrochloride, 2,2'-azobis[2-(2-imidazolin-2-yl)propane] dihydrochloride, 2,2'-azobis[2-(2-imidazolin-2-yl)propane] disulfate dihydrate, 2,2'-azobis[2-(2-imidazolin-2-yl)propane], and/or a 2,2'-azobis[N-(2-carboxyethyl)-2-methylpropionamidine] n-hydrate, and
wherein monomers in the polymerization consist of at least one of the first compound and at least one of the second compound.

7. The method of claim 1, wherein the second compound comprises methyl vinyl phosphonate.

8. A method for producing a polyvinylphosphonic acid copolymer, the method comprising:
polymerizing a first compound of formula (1) and a second compound of formula (2) in presence of a radical polymerization initiator and in a water-containing solvent:

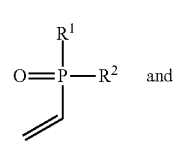 (1)

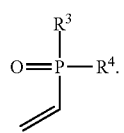 (2)

wherein
R¹ and R² are independently —OH, —O⁻, or —O⁻M⁺, with M⁺ being a counter ion,
R³ is —OH, —O⁻, —O⁻M⁺, or an optionally substituted alkoxy group comprising 1 to 10 carbon atoms, with M⁺ being a counter ion, and
R⁴ is an optionally substituted alkoxy group comprising 1 to 10 carbon atoms, R³ and R⁴ optionally forming a ring together with an adjacent phosphorus atom when both R³ and R⁴ are alkoxy groups,
wherein the radical polymerization initiator comprises 2,2'-azobis(2-methylpropionamidine) dihydrochloride, 2,2'-azobis[2-(2-imidazolin-2-yl)propane] dihydrochloride, 2,2'-azobis[2-(2-imidazolin-2-yl)propane] disulfate dihydrate, 2,2'-azobis[2-(2-imidazolin-2-yl)propane], and/or a 2,2'-azobis[N-(2-carboxyethyl)-2-methylpropionamidine] n-hydrate, and
wherein the second compound comprises dimethyl vinylphosphonate and/or diethyl vinylphosphonate.

9. The method of claim 1, wherein the second compound comprises ethyl vinylphosphonate.

10. The method of claim 8, wherein the second compound comprises the diethyl vinylphosphonate.

11. The method of claim 1, wherein the radical polymerization initiator comprises the 2,2'-azobis[2-(2-imidazolin-2-yl)propane]disulfate dihydrate.

12. The method of claim 1, wherein the radical polymerization initiator comprises the 2,2'-azobis[2-(2-imidazolin-2-yl)propane].

13. The method of claim 1, wherein the radical polymerization initiator comprises a the 2,2'-azobis[N-(2-carboxyethyl)-2-methylpropionamidine] n-hydrate.

14. The method of claim 1, wherein a total amount of the first compound and the second compound is 90 mol. % or more, based on total monomer moles.

15. A method for producing a polyvinylphosphonic acid copolymer, the method comprising:

polymerizing a first compound of formula (1) and a second compound of formula (2) in presence of a radical polymerization initiator and in a water-containing solvent:

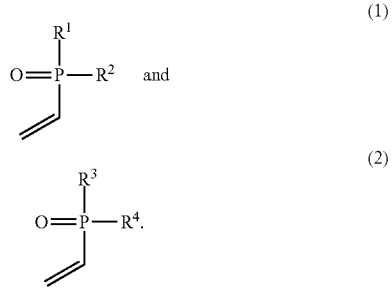

wherein
$R^1$ and $R^2$ are independently —OH, —O⁻, or —O⁻M⁺, with M⁺ being a counter ion,
$R^3$ is —OH, —O⁻, —O⁻M⁺, or an optionally substituted alkoxy group comprising 1 to 10 carbon atoms, with M⁺ being a counter ion, and
$R^4$ is an optionally substituted alkoxy group comprising 1 to 10 carbon atoms, $R^3$ and $R^4$ optionally forming a ring together with an adjacent phosphorus atom when both $R^3$ and $R^4$ are alkoxy groups,
wherein the radical polymerization initiator comprises 2,2'-azobis(2-methylpropionamidine) dihydrochloride, 2,2'-azobis[2-(2-imidazolin-2-yl)propane] dihydrochloride, 2,2'-azobis[2-(2-imidazolin-2-yl)propane] disulfate dihydrate, 2,2'-azobis[2-(2-imidazolin-2-yl)propane], and/or a 2,2'-azobis[N-(2-carboxyethyl)-2-methylpropionamidine] n-hydrate, and
wherein monomers in the polymerization consist of at least one of the first compound and at least one of the second compound.

16. The method of claim 8, wherein the radical polymerization initiator comprises the 2,2'-azobis(2-methylpropionamidine) dihydrochloride.

17. The method of claim 10, wherein the radical polymerization initiator comprises the 2,2'-azobis(2-methylpropionamidine) dihydrochloride.

18. The method of claim 15, wherein the radical polymerization initiator comprises the 2,2'-azobis(2-methylpropionamidine) dihydrochloride.

19. The method of claim 8, wherein the second compound comprises the dimethyl vinylphosphonate.

20. The method of claim 19, wherein the radical polymerization initiator comprises the 2,2'-azobis(2-methylpropionamidine) dihydrochloride.

* * * * *